(12) United States Patent
Asano

(10) Patent No.: US 8,146,699 B2
(45) Date of Patent: Apr. 3, 2012

(54) MOTORCYCLE

(75) Inventor: Tatsuhiko Asano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 349 days.

(21) Appl. No.: 12/393,736

(22) Filed: Feb. 26, 2009

(65) Prior Publication Data

US 2009/0242305 A1 Oct. 1, 2009

(30) Foreign Application Priority Data

Mar. 27, 2008 (JP) ................................. 2008-082440

(51) Int. Cl.
*B62D 11/05* (2006.01)
*F02M 35/02* (2006.01)

(52) U.S. Cl. .................................... 180/219; 123/198 E

(58) Field of Classification Search .................. 180/219, 180/225, 68.3; 123/184.21, 198 E; 55/385.3
See application file for complete search history.

(56) References Cited

U.S. PATENT DOCUMENTS

| 5,172,788 | A | * | 12/1992 | Fujii et al. | 180/219 |
| 2001/0030071 | A1 | * | 10/2001 | Okuma | 180/219 |
| 2002/0189877 | A1 | * | 12/2002 | Yagisawa et al. | 180/219 |
| 2005/0133289 | A1 | * | 6/2005 | Nakano et al. | 180/219 |
| 2006/0065457 | A1 | * | 3/2006 | Miyabe et al. | 180/219 |
| 2008/0060864 | A1 | * | 3/2008 | Arai | 180/219 |
| 2008/0230030 | A1 | * | 9/2008 | Kawai et al. | 123/184.21 |

FOREIGN PATENT DOCUMENTS

JP  2006-240619 A  9/2006

* cited by examiner

*Primary Examiner* — Anne Marie M Boehler
(74) *Attorney, Agent, or Firm* — Birch, Stewart, Kolasch & Birch, LLP

(57) ABSTRACT

A motorcycle includes a head pipe arranged at a front portion of a body and configured to pivotally support a front fork; a main frame passing an upper side of an engine from the head pipe and extending towards a rear of the body; a rear frame extending towards the rear of the body from the main frame and supporting a seat at an upper side thereof; an air cleaner case at a lower side of the seat; and an air cleaner element arranged inside the air cleaner case and configured to clean air, wherein the rear frame includes a pair of left and right rear bodies of a plate shape which cover sides of the air cleaner case, and a plurality of cross members configured to couple the left and right rear bodies, and wherein each rear body is formed with a projection projecting towards an inner side of the body, and a receiving portion configured to fit the projection is formed on the air cleaner case.

8 Claims, 17 Drawing Sheets

MOTORCYCLE

CROSS-REFERENCE TO RELATED APPLICATIONS

This nonprovisional application claims priority under 35 U.S.C. §119(a) on Patent Application No. 2008-082440, filed in Japan on Mar. 27, 2008, the entirety of which is incorporated herein by reference.

BACKGROUND OF THE INVENTION

1. Field of the Invention

The present invention relates to a motorcycle, and more particular, to a motorcycle having an air cleaner case equipped on an inner side of a rear frame.

2. Background of the Invention

A rear frame, extending towards the rear from the vicinity of the center of a body frame, configured by a rail-shaped seat rail is known in the related art (see e.g., Japanese Patent Publication No. 2006-240619). In the configuration disclosed in Japanese Patent Publication No. 2006-240619, a cross member is bridged between a seat rail divided in half to the left and the right to form the rear frame.

SUMMARY OF THE INVENTION

In motorcycles, a structure in which an air cleaner case is fixed on the inner side of the rear frame is often used. The rear frame and the air cleaner case are preferably detachable in view of assembly and maintenance. Thus, in the motorcycle, the air cleaner case is desirably fixed to the rear frame in a detachable maimer with a simple structure. In view of the above situations, it is an object of the present invention to enable an air cleaner case to be detachably fixed to the rear frame with a simple structure in the motorcycle.

In order to achieve the above object, in accordance with a first aspect of the present invention, a motorcycle includes a head pipe arranged at a front portion of a body and configured to pivotally support a front fork; a main frame passing an upper side of an engine from the head pipe and extending towards a rear of the body; a rear frame extending towards the rear of the body from the main frame and supporting a seat at an upper side thereof; an air cleaner case at a lower side of the seat; and an air cleaner element arranged inside the air cleaner case and configured to clean air, wherein the rear frame includes a pair of left and right rear bodies of a plate shape which cover sides of the air cleaner case, and a plurality of cross members configured to couple the left and right rear bodies, and wherein each rear body is formed with a projection projecting towards an inner side of the body, and a receiving portion configured to fit the projection is formed on the air cleaner case. Therefore, the rear frame is assembled by coupling the plate-shaped rear bodies, divided to the left and the right, with the plurality of cross members, and the air cleaner case is fixed inside the rear frame by fitting the projection arranged on each rear body to the receiving portion of the air cleaner case. Therefore, the air cleaner case can be easily fixed to the rear frame by simply fitting the projection of the rear body to the receiving portion of the air cleaner case. The air cleaner case fitted to the projection of the rear body can be easily detached by detaching the coupling of the rear body and the cross member since the air cleaner case is fixed by the fitting of the projection of the rear body and the receiving portion of the air cleaner case without using a screw and the like. Therefore, the air cleaner case can be detachably fixed to the rear frame with a simple structure by a configuration of fitting the projection arranged on the left and right divided rear body to the receiving portion of the air cleaner case. With the simple structure, the degree of design freedom is enhanced, and the outer appearance is improved.

In accordance with a second aspect of the present invention, the rear body and the cross member may be detachably coupled with a bolt. Since the rear body and the cross member are attached and detached with the bolt, the assembling and the dissembling of the rear frame are facilitated and the air cleaner case can be detachably fixed to the rear frame with a simple structure.

In accordance with a third aspect of the present invention, a space in the rear frame surrounded by the rear body and the cross members may be formed with an opening towards the upper side, and the air cleaner case may include a cover facing the opening from the space in the rear frame, the cover being openable to dissemble and assemble the air cleaner element. Therefore, the maintenance performance is satisfactory since the cover of the air cleaner case is detached from the opening on the upper side of the rear frame with the seat removed, the air cleaner element is detached from the air cleaner case, and the air cleaner element is easily dissembled and assembled for maintenance.

In accordance with a fourth aspect of the present invention, the cover may be opened at an upper side from the receiving portion arranged on the air cleaner case. Since the cover of the air cleaner case can be open at the upper side above the receiving portion to be fitted with the projection, the cover can be easily opened without resolving the fitting of the projection and the receiving portion. That is, the cover can be opened without detaching the air cleaner case from the rear frame. Thus, the air cleaner element can be easily dissembled and assembled for maintenance, whereby the maintenance performance is satisfactory.

In accordance with a fifth aspect of the present invention, the receiving portion may be a pass-through hole formed on an upstream side of an air flow than the air cleaner element in the air cleaner case. Since the receiving portion is the pass-through hole, the projection to be fitted to the pass-through hole does not need to be strictly managed with the axial length dimension, and thus the manufacturing of the rear body is facilitated. The position of the pass-through hole is the so-called dirty side on which the air before cleaning flows. Therefore, problems do not arise even if small amount of air flows in from the pass-through hole, and influence of arranging the pass-through hole can be prevented.

In accordance with a sixth aspect of the present invention, the receiving portion may be a recess arranged on a downstream side of an air flow than the air cleaner element in the air cleaner case. Therefore, the receiving portion to be fitted with the projection can also be arranged on the clean side, and thus the degree of freedom of design can be enhanced. Since the receiving portion is the recess that does not pass through the air cleaner case, the unclean air is not taken into the clean side even if the receiving portion is arranged on the so-called clean side.

In accordance with the first aspect of the present invention, the air cleaner case is easily fixed to the rear frame by simply fitting the projection of the rear body to the receiving portion of the air cleaner case with a configuration of fitting the projection arranged on the left and right divided rear body to the receiving portion of the air cleaner case. Thus, the air cleaner case can be detachably fixed to the rear frame with a simple structure. With such a simple structure, the degree of design freedom is enhanced, and the outer appearance is improved.

In accordance with the second aspect of the present invention, since the rear frame is easily assembled and dissembled by a bolt, the air cleaner case can be detachably fixed to the rear frame with a simple structure.

In accordance with the third aspect of the present invention, the maintenance performance is satisfactory since the air cleaner element is detached through the opening on the upper side of the rear frame and the air cleaner element is easily dissembled and assembled for maintenance.

In accordance with the fourth aspect of the present invention, the cover of the air cleaner case is easily opened without resolving the fitting of the projection of the rear body and the receiving portion of the air cleaner case, and thus the air cleaner element is easily dissembled and assembled for maintenance, whereby the maintenance performance is satisfactory.

In accordance with the fifth aspect of the present invention, since the projection of the rear body is fitted to the pass-through hole on the upstream side of the air flow above the air cleaner element, the axial length dimension of the projection does not need to be strictly managed, and the manufacturing of the rear body is facilitated.

In accordance with the sixth aspect of the present invention, since the receiving portion to be fitted with the projection is the recess that does not pass through the air cleaner case, the receiving portion may be arranged on the downstream side of the air flow below the air cleaner element, and the degree of design freedom can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE ILLUSTRATED EMBODIMENTS

Figure 1:
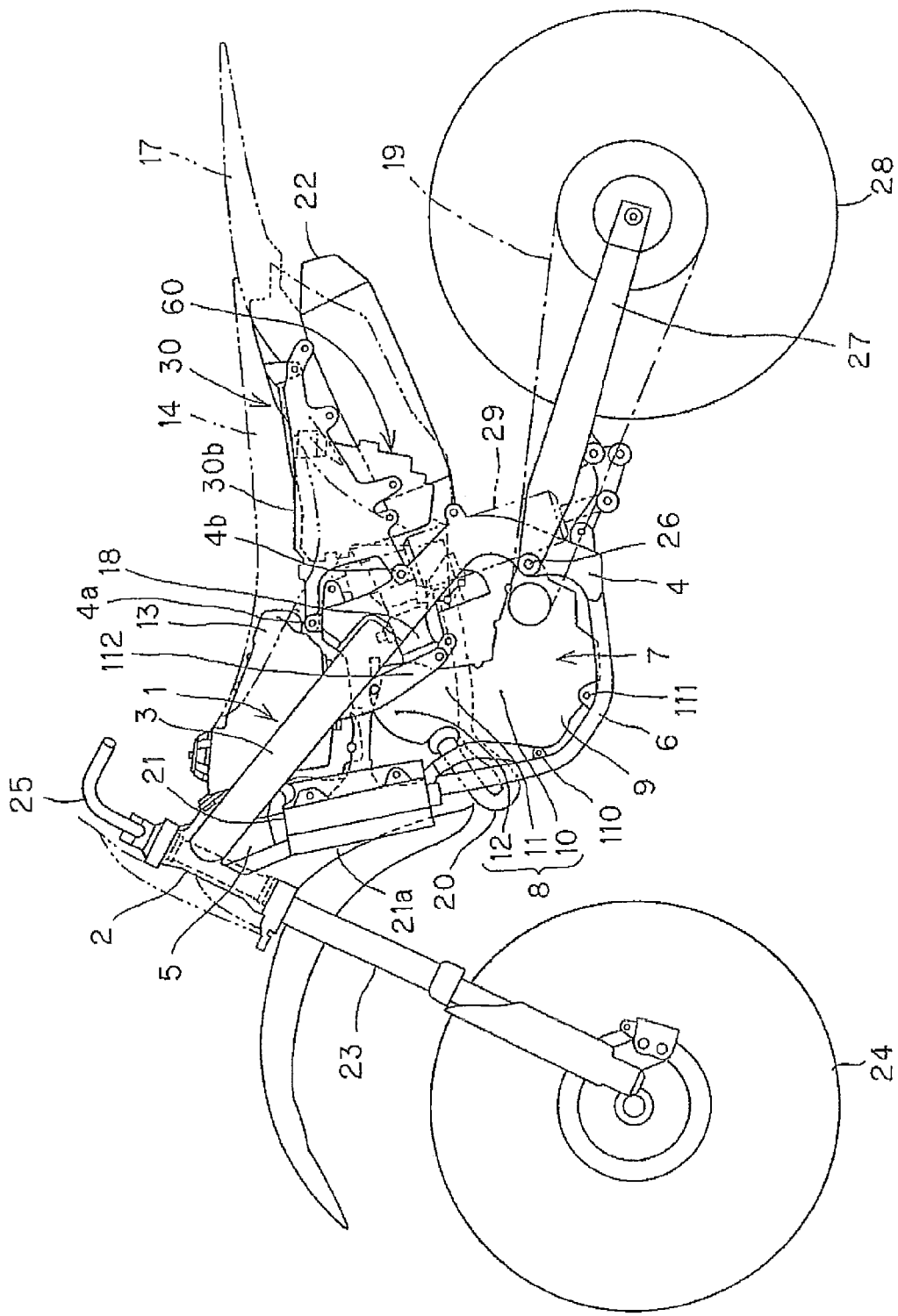
FIG. 1 is a side view of a motorcycle according to a first embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

First Embodiment

FIG. 1 is a side view of an off-road motorcycle according to a first embodiment applied with the present invention. A body frame 1 of a motorcycle according to the first embodiment includes a head pipe 2, a main frame 3, a center frame 4, a down frame 5, and a lower frame 6, which are connected in a loop form and have an engine 7 supported on an inner side. The engine 7 includes a cylinder 8 extending to the upper side from a crankcase 9. The main frame 3, the center frame 4, and the lower frame 6 are respectively arranged in left and right pairs, and one head pipe 2 and one down frame 5 are arranged along a center line in a left and right direction of the body.

The main frame 3 linearly extends towards the rear diagonally downward at the upper side of the engine 7 from the head pipe 2, and is coupled to an upper end of the center frame 4 extending in an up and down direction at the rear side of the engine 7. The down frame 5 extends diagonally downward at the front side of the engine 7 from the head pipe 2, and is coupled to a front end of the low frame 6 at the front side of the cylinder 8. The lower frame 6 bends to the lower side of the crankcase 9 at the front side of the crankcase 9, linearly extends towards the rear at the lower side of the crankcase 9, and is coupled to a lower end of the center frame 4 at the rear end. A frame is bridged in a width direction at the upper end and the lower end of the center frame 4 to thereby couple the left and right center frames 4.

Furthermore, the center frame 4 is fixed with a rear frame 30 extending towards the rear of the body from the upper end of the center frame 4. A rear fender 17 extending towards the rear portion of the body is fixed to the rear end of the rear frame 30.

The engine 7 is a water-cooled 4-cycle, single-cylinder engine. The cylinder 8 is arranged at a front portion of the crankcase 9 with a cylinder axis line slightly tilted towards the front side, and includes a cylinder block 10, a cylinder head 11, and a head cover 12 in order from the bottom to the top. The cylinder block 10 is formed with a cylinder section (not shown), which is a tubular space in which a piston (not shown) can reciprocate in the up and down direction. The front and rear direction of the engine 7 can be shortened by substantially upstanding the cylinder 8 so that the engine 7 is suitable for off-road vehicles.

An exhaust pipe 20 is connected to the front portion of the cylinder 8. The exhaust pipe 20 extends towards the front side of the crankcase 9 from the front portion of the cylinder 8, is bent to the right side, and then drawn towards the rear at the right side of the body. A muffler 22 is connected to the rear end of the exhaust pipe 20, which muffler 22 is supported by the rear frame 30.

A fuel tank 13 is supported on the main frame 3 at the upper side of the engine 7. A built-in fuel pump (not shown) is accommodated in the fuel tank 13, and high pressure fuel is supplied from the fuel pump to a throttle body 18 through a fuel supply pipe.

A passenger seat 14 extends from the upper portion of the fuel tank 13 towards the rear end of the rear frame 30, and is supported at the upper side of the fuel tank 13 and the rear frame 30. An air cleaner case 60 is supported at the lower side of the seat 14 where air flowed into and cleaned in the air cleaner case 60 becomes mixed air through the throttle body 18, where mixed air is taken in from the rear side of the body into the cylinder head 11.

A pair of left and right front forks 23 is pivotally supported by the head pipe 2 arranged at the front portion of the body, where a front wheel 24 supported at the lower end of the front fork 23 is steered by a handlebar 25 attached to the upper end of the front fork 23.

The down frame 5 is arranged with a radiator 21 on the left and the right over the down frame 5. The radiator 21 is arranged in the up and down direction from the lower portion of the head pipe 2 towards the front side of the cylinder head 11 along the down frame 5. The radiator 21 is attached with a radiator grille 21a to protect the radiator 21 and to guide the travel wind.

A front end of a rear arm 27 is coupled to the center frame 4 by way of a pivot shaft 26, so that the rear arm 27 is supported in a freely swinging manner. A rear wheel 28 is supported at the rear end of the rear arm 27, and driven by a drive chain 19 wrapped around a drive sprocket 7a of the engine 7 and a driven sprocket 28a of the rear wheel 28. A cushion unit 29 of a rear suspension is arranged between the rear arm 27 and the rear end of the center frame 4.

The engine 7 is supported at the body frame 1 by engine mounts 110, 111, an engine hanger 112, and the pivot shaft 26.

Figure 2:
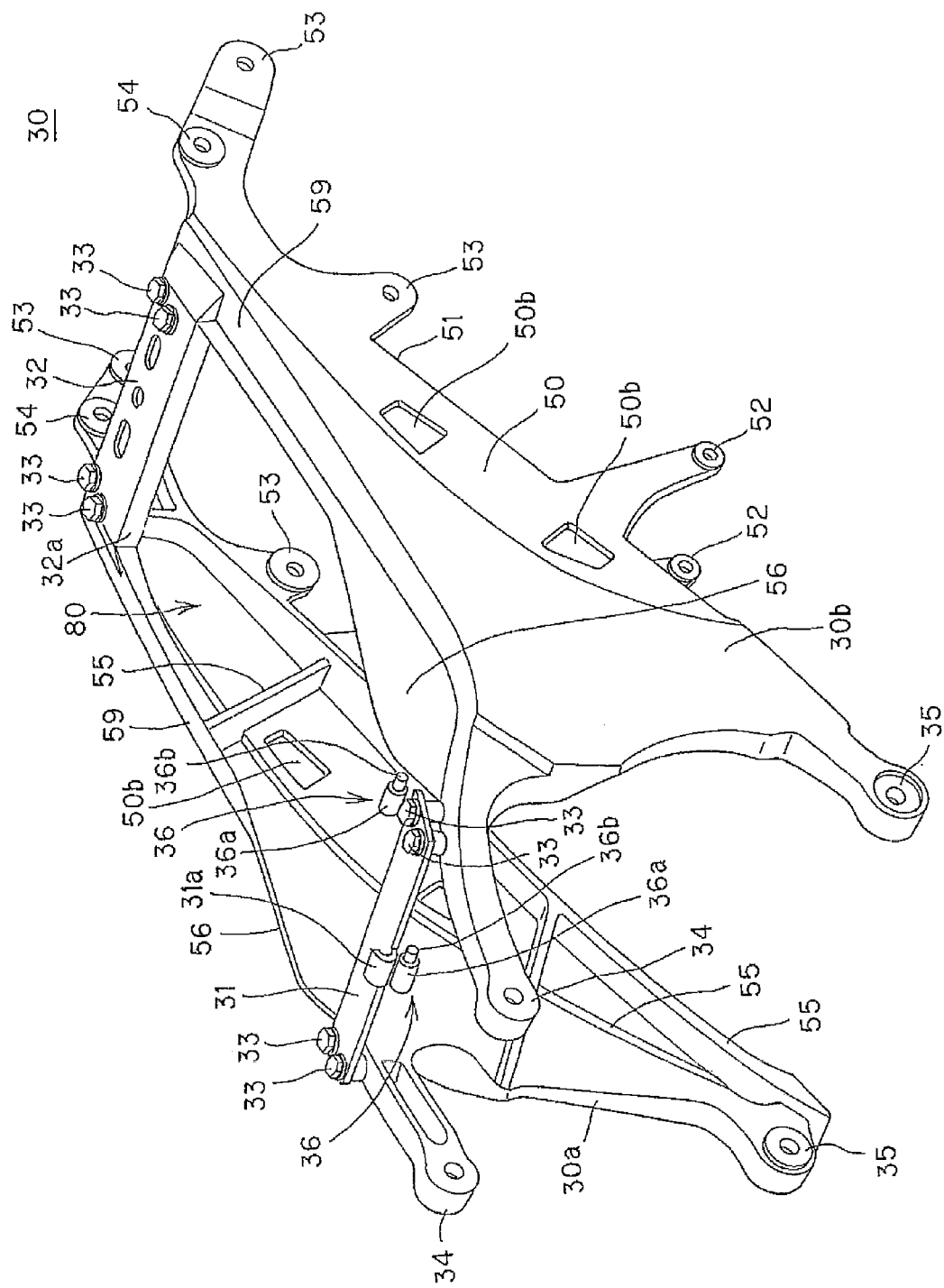
FIG. 2 is a perspective view of the rear frame seen from the front on the right side of the body.
Figure 3:
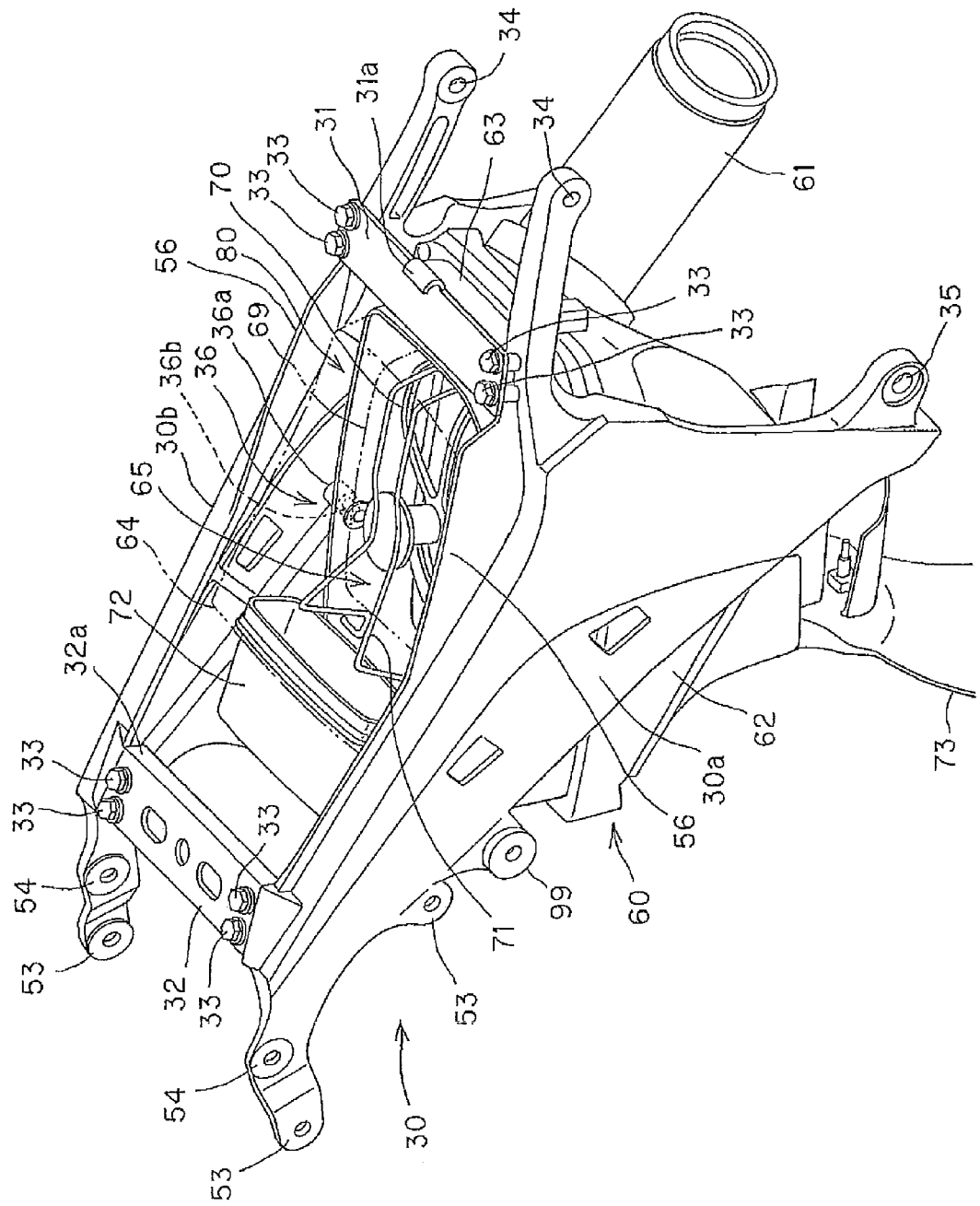
FIG. 3 is a perspective view of the rear frame and an air cleaner case.

FIG. 2 is a perspective view of the rear frame 30 seen from the front on the right side of the body. FIG. 3 is a perspective view of the rear frame 30 and the air cleaner case 60. In FIG. 3, an outline of the upper portion of the air cleaner case 60 is shown with a chain double-dashed line.

The rear frame 30 includes a right rear body 30a positioned on the right side of the body, a left rear body 30b positioned on the left side, and a front cross member 31 and a rear cross member 32 for coupling the right rear body 30a and the left rear body 30b.

The right rear body 30a and the left rear body 30b are a pair of left and right plate-shaped members formed substantially symmetrically. The right rear body 30a and the left rear body 30b extend in the front and rear direction of the body, and are formed to a substantially triangular shape in which the front portion is long in the up and down direction and the rear portion is short in the up and down direction.

The rear frame 30 is configured so that the right rear body 30a and the left rear body 30b face each other while being spaced apart from each other in the width direction, and are coupled by the front cross member 31 and the rear cross member 32.

The front cross member 31 and the rear cross member 32 are formed with a hole (not shown), through which a bolt 33 is passed, at two locations at both ends of plate shape. The front cross member 31 is bridged over the upper surface at the front portion of the left and right rear bodies 30b, 30a, and the rear cross member 32 is bridged over the upper surface at the rear portion of the left and right rear bodies 30b, 30a. The front cross member 31 and the rear cross member 32 are fixed to the left and right rear bodies 30b, 30a by the bolt 33 arranged by twos at the respective ends. The rear frame 30 thus has a configuration in which the right rear body 30a and the left rear body 30b are coupled by the front cross member 31 and the rear cross member 32, and a space is formed between the right rear body 30a and the left rear body 30b on the inner side of the rear frame 30.

A hook 31a for hooking a band (not shown) for coupling the fuel tank 13 and the rear frame 30 is formed at the intermediate portion in the width direction of the front cross member 31. The rear cross member 32 is subject to thinning and the edge on the front side of the body is folded to thereby form a rib 32a.

On each inner side surface of the right rear body 30a and the left rear body 30b, a columnar projection 36 projecting towards the inner side of the body is arranged in an upstanding manner so as to face each other. The projection 36 is arranged at two locations at the right rear body 30a and the left rear body 30b with a distance in the front and rear direction of the body. Specifically, a total of four projections 36 are formed, each being formed by a base 36a arranged in an upstanding manner on the inner side surface and a projection distal end 36b having the distal end of the base 36a formed to a small diameter.

As shown in FIG. 3, the air cleaner case 60 is arranged in the space on the inner side of the rear frame 30.

Figure 4:
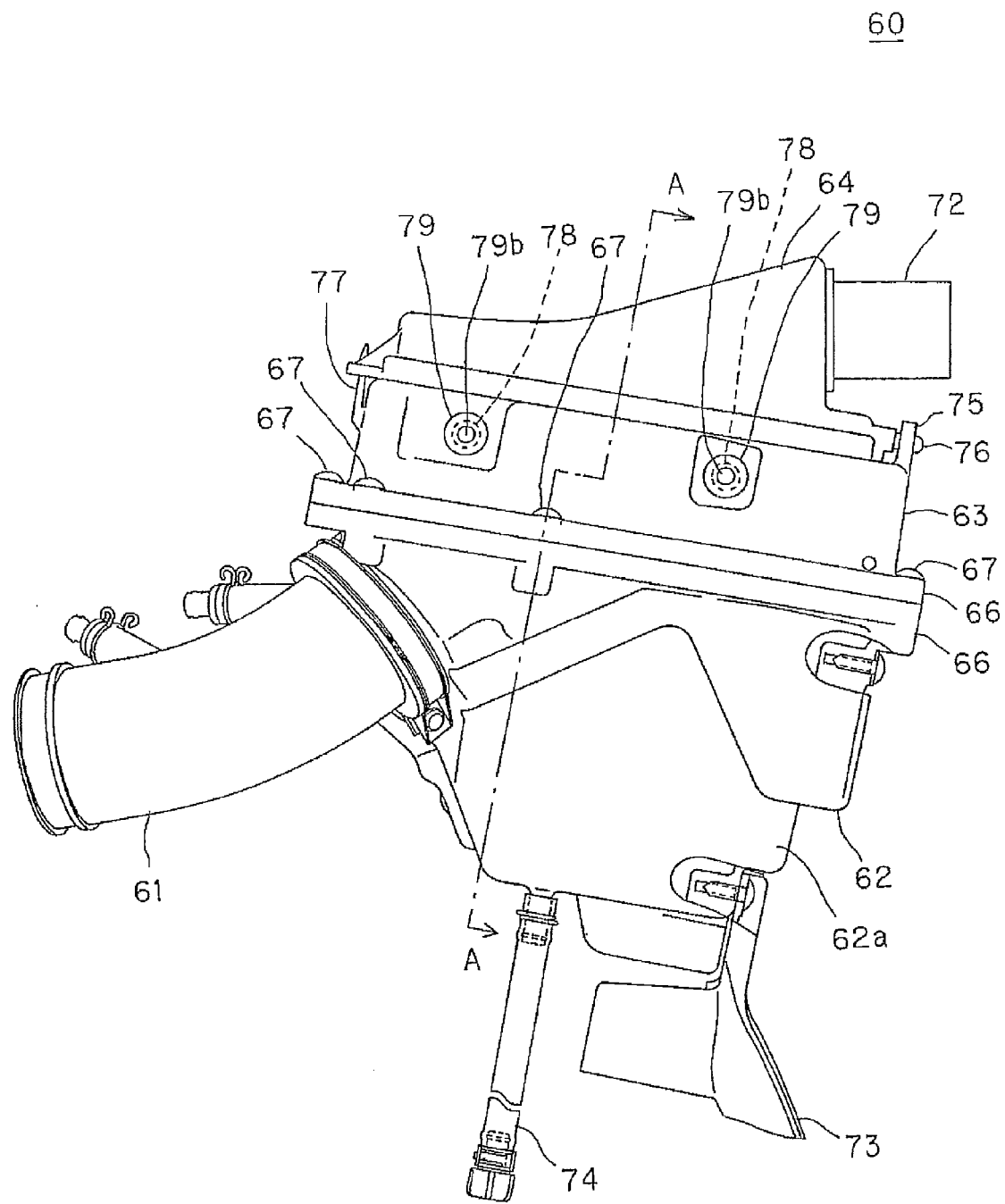
FIG. 4 is a side view of the air cleaner case seen from the left side of the body.
Figure 5:
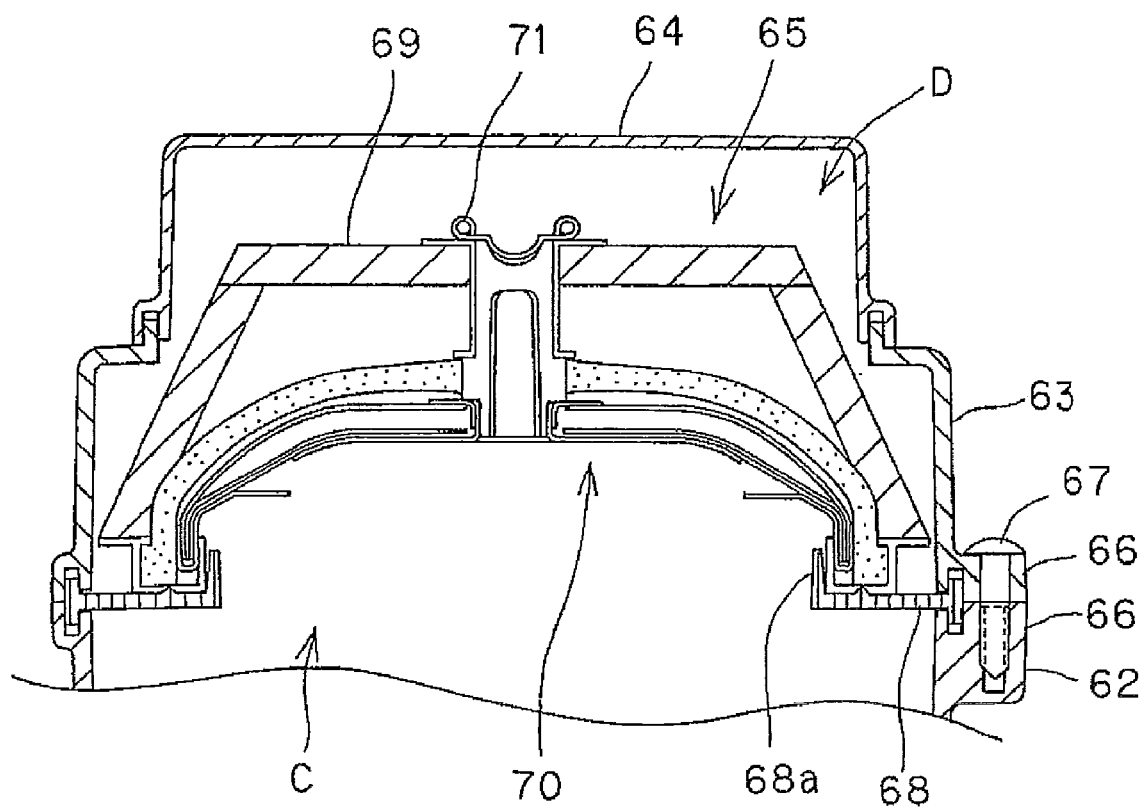
FIG. 5 is a cross-sectional view of the air cleaner case taken along line A-A in FIG. 4.

FIG. 4 is a side view of the air cleaner case 60 seen from the left side of the body. FIG. 5 is a cross-sectional view of the air cleaner case 60 taken along line A-A in FIG. 4.

The air cleaner case 60 includes a connecting tube 61 for supplying air to the throttle body 18, a lower case 62 to be connected with the connecting tube 61, an upper case 63 to be attached to the lower case 62, a cover 64 attached in an open/close manner at the upper portion of the upper case 63, and an air cleaner element 65 for cleaning the air flowed into the air cleaner case 60.

As shown in FIG. 3 to FIG. 5, the lower case 62 and the upper case 63 having a substantially rectangular cross-section in the top view are combined to form a case body with an opened upper portion, and the cover 64 is attached as a lid for the opening of the case body to form a box-shaped air cleaner case 60.

The connecting tube 61 extending towards the front side of the body is attached to the front portion of the lower case 62, and a mud guard 73 for preventing attachment of mud and the like splashed by the rear wheel 28 to the air cleaner case 60 is arranged at the rear portion of the lower case 62. A tube 74 communicating to the interior of the lower case 62 is attached to the lower portion of the lower case 62, and a detachable plug is attached to the lower end of the tube 74. A recessed portion 62a depressed in accordance with the shape of the battery 90, to be hereinafter described, is formed at one part on the left side surface of the lower case 62.

A flange 66 in which the ends of the lower case 62 and the upper case 63 are projected to the outer side is formed at the joining portion of the lower case 62 and the upper case 63. The upper case 63 is fixed to the lower case 62 by a plurality of screws 67 at the flange 66, and an attachment plate 68 is interposed at the joining portion of the upper case 63 and the lower case 62. The attachment plate 68 is a frame-shaped member to be attached with the air cleaner element 65, and has an opening on the inner side.

The air cleaner element 65 includes a sponge-like filter 69 made from resin fiber, and a filter base 70 for holding the filter 69. The frame-shaped filter base 70 is fitted to the inner side of the filter 69 to be integral with the filter 69, thereby configuring the air cleaner element 65.

As shown in FIG. 5, the air cleaner element 65 is attached to the attachment plate 68 fixed to the interior of the air cleaner case 60. As shown in FIG. 3 and FIG. 5, an element holder 71 is attached to the upper portion of the upper case 63 across the front and rear ends of the upper case 63. The element holder 71 is formed by bending a wire metal, and biases the attachment plate 68 from the upper side by predetermined elasticity. The air cleaner element 65 is fixed to the attachment plate 68 by the bias force of the element holder 71.

A wall portion 68a is arranged in an upstanding manner facing the upper side at the edge of the opening of the attachment plate 68, and the air cleaner element 65 is attached in accordance with the wall portion 68a, so that positioning of the air cleaner element 65 is facilitated. The wall portion 68a has an effect of preventing foreign substances and the like from entering the lower case 62 from between the air cleaner element 65 and the attachment plate 68.

As shown in FIG. 3 and FIG. 4, the cover 64 has a duct 72 projecting towards the rear of the body. The distal end of the duct 72 is opened towards the rear of the body to act as an air intake port. The air taken into the air cleaner case 60 is taken in from the duct 72 to the interior of the upper case 63, cleaned when passing the air cleaner element 65, reached to the lower case 62 and supplied to the throttle body 18 through the connecting tube 61.

The cover 64 is detachably attached to the upper portion of the upper case 63. Specifically, as shown in FIG. 5, the cover 64 is attached such that a groove formed over the entire edge of the lower surface of the cover 64 engages a protruding wall portion arranged on the upper surface of the upper case 63. As shown in FIG. 4, the cover 64 is made detachable by inserting a protrusion 76 arranged at the lower side of the duct 72 of the cover 64 to an inserting portion 75 formed at the rear end of the upper surface of the upper case 63, and fixing the front portion of the cover 64 by a fixture 77 arranged at the front portion of the upper case 63.

As shown in FIG. 5, in the interior of the air cleaner case 60, the upstream side of the air flow above the air cleaner element 65 is referred to as a dirty side D, and the side the cleaned air passes on the downstream below the air cleaner element 65 is referred to as a clean side C.

As shown in FIG. 4, the air cleaner case 60 is formed with a pass-through hole 78, serving as a receiving portion to be fitted with the projection 36 of the rear frame 30, at the side surface in the width direction of the upper case 63. The pass-through hole 78 passes the interior of the upper case 63, where the position formed with the pass-through hole 78 is the dirty side D in the interior of the air cleaner case 60. The pass-through hole 78 is arranged by twos at each left and right side surfaces of the air cleaner case 60 in correspondence to the position of the projection 36 of the rear frame 30.

As shown in FIG. 3, the air cleaner case 60 is fixed to the inner side of the rear frame 30 by assembly such that four projections 36 arranged in an upstanding manner at the right rear body 30a and the left rear body 30b are fitted to the four pass-through holes 78 formed on the left and right side surfaces of the air cleaner case 60.

Figure 6:
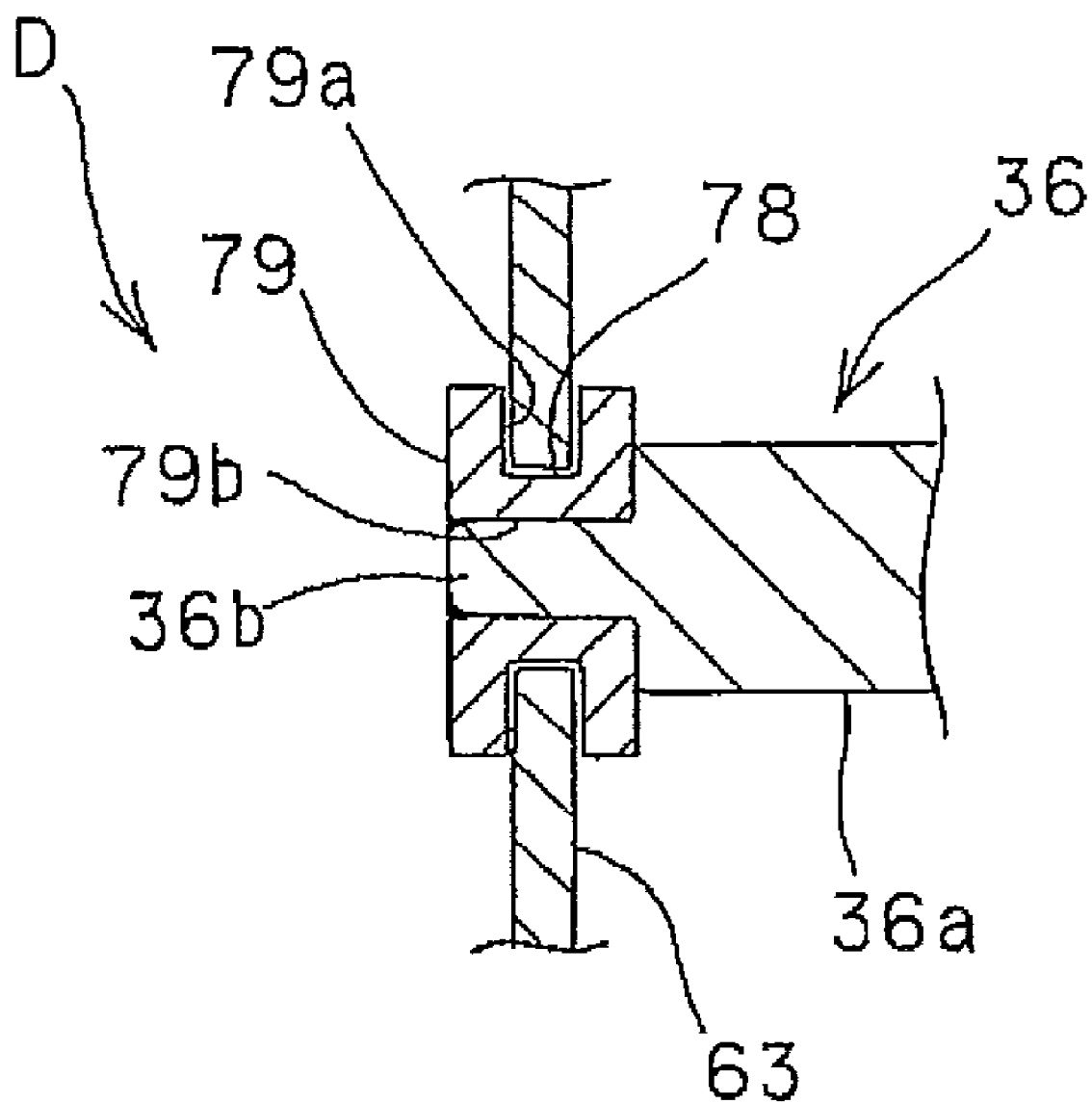
FIG. 6 is a cross-sectional view of a fit-in portion of the pass-through hole and the projection.

FIG. 6 is a cross-sectional view of a fit-in portion of the pass-through hole 78 and the projection 36. As shown in FIG. 4 and FIG. 6, the pass-through hole 78 is attached with a disc-shaped fit-in member 79. The fit-in member 79 has a groove 79a in which a center portion of the disc-shaped outer periphery is depressed, which groove 79a is fitted to the edge of the pass-through hole 78 and attached to the pass-through hole 78. The fit-in member 79 has a pass-through hole 79b at the middle, where the projection distal end 36b of the projection 36 is fitted into the pass-through hole 79b. That is, the projection 36 of the right rear body 30a and the left rear body 30b is fitted to the pass-through hole 78 of the air cleaner case 60 by way of the fit-in member 79.

As shown in FIG. 6, the projection distal end 36b passes through the wall portion of the upper case 63 up to the interior of the air cleaner case 60. An end of the base 36a of the projection 36 abuts on the fit-in member 79 positioned on the outer side of the air cleaner case 60. Therefore, the air cleaner case 60 is sandwiched by the projection 36 from both left and right sides of the body so that the position in the width direction is fixed.

The fit-in member 79 is made from rubber material herein, so that the fit-in member 79 can be deformed to enable the projection 36 to be press fit. Therefore, the air cleaner case 60 can be reliably fixed without rattling. Since the fit-in member 79 is made of rubber material, vibration transmitted to the air cleaner case 60 can be reduced.

As shown in FIG. 3 and FIG. 4, with regard to the procedures for assembling the rear frame 30, the air cleaner case 60 is first sandwiched by the right rear body 30a and the left rear body 30b so as to fit each projection 36 of the right rear body 30a and the left rear body 30b to the pass-through hole 78 at each left and right side surface of the air cleaner case 60. The front cross member 31 and the rear cross member 32 are then bridged between the right rear body 30a and the left rear body 30b, and coupled by the bolt 33 to assemble the rear frame 30. In this case, the air cleaner case 60 is fixed on the inner side of the rear frame 30 with each projection 36 fitted to each pass-through hole 78 simultaneously with the assembly of the rear frame 30. The rear frame 30 can be dissembled by simply detaching the bolt 33. Therefore, the air cleaner case 60 can be easily detached from the rear frame 30.

Therefore, the air cleaner case 60 can be detachably fixed to the rear frame 30 with a simple structure by a configuration of fitting the projection 36 arranged on the right rear body 30a and the left rear body 30b to the pass-through hole 78 of the air cleaner case 60.

As shown in FIG. 3, the air cleaner case 60 has the left and right sides covered from the lower portion on the front side towards the upper portion on the rear side by the right rear body 30a and the left rear body 30b extending upward towards the rear. As shown in FIG. 4, the air cleaner case 60 is attached at an angle where the end of the duct 72 becomes substantially perpendicular, and the air cleaner case 60 is fixed to the rear frame 30 downward towards the rear.

As shown in FIG. 3, an opening 80 is formed in a space at the interior of the rear frame 30 between the front cross member 31 and the rear cross member 32. The air cleaner case 60 is fixed in the space on the inner side of the rear frame 30 such that the cover 64 faces the opening 80. The cover 64 is attached on the upper side above the pass-through hole 78 formed in the air cleaner case 60, and thus can be opened and closed without resolving the fitting of the projection 36 and the pass-through hole 78. Therefore, the air cleaner element 65 attached on the interior of the air cleaner case 60 can be easily detached without detaching the air cleaner case 60 from the projection 36, by opening the cover 64 and turning the element holder 71 with the seat 14 detached. Thus, the maintenance performance is efficient since the air cleaner element 65 can be detached and the air cleaner element 65 can be easily dissembled and assembled.

As shown in FIG. 3, at the left and right rear bodies 30b, 30a, a hole 34 is formed at an end of an extended portion extending towards the front at the upper portion on the front side of the body, and a hole 35 is formed at a portion projecting towards the front at the lower portion on the front side of the body. As shown in FIG. 1, the rear frame 30 interiorly fixed with the air cleaner case 60 is fixed to attachments 4a, 4b arranged at the upper stage and the middle stage in the up and down direction of the body in the center frame 4 by bolting through the holes 34, 35. Since the air cleaner case 60 can be assembled to the body by simply bolting the rear frame 30 already fixed with the air cleaner case 60 to the center frame 4, the assembly of the body is facilitated.

Figure 7:
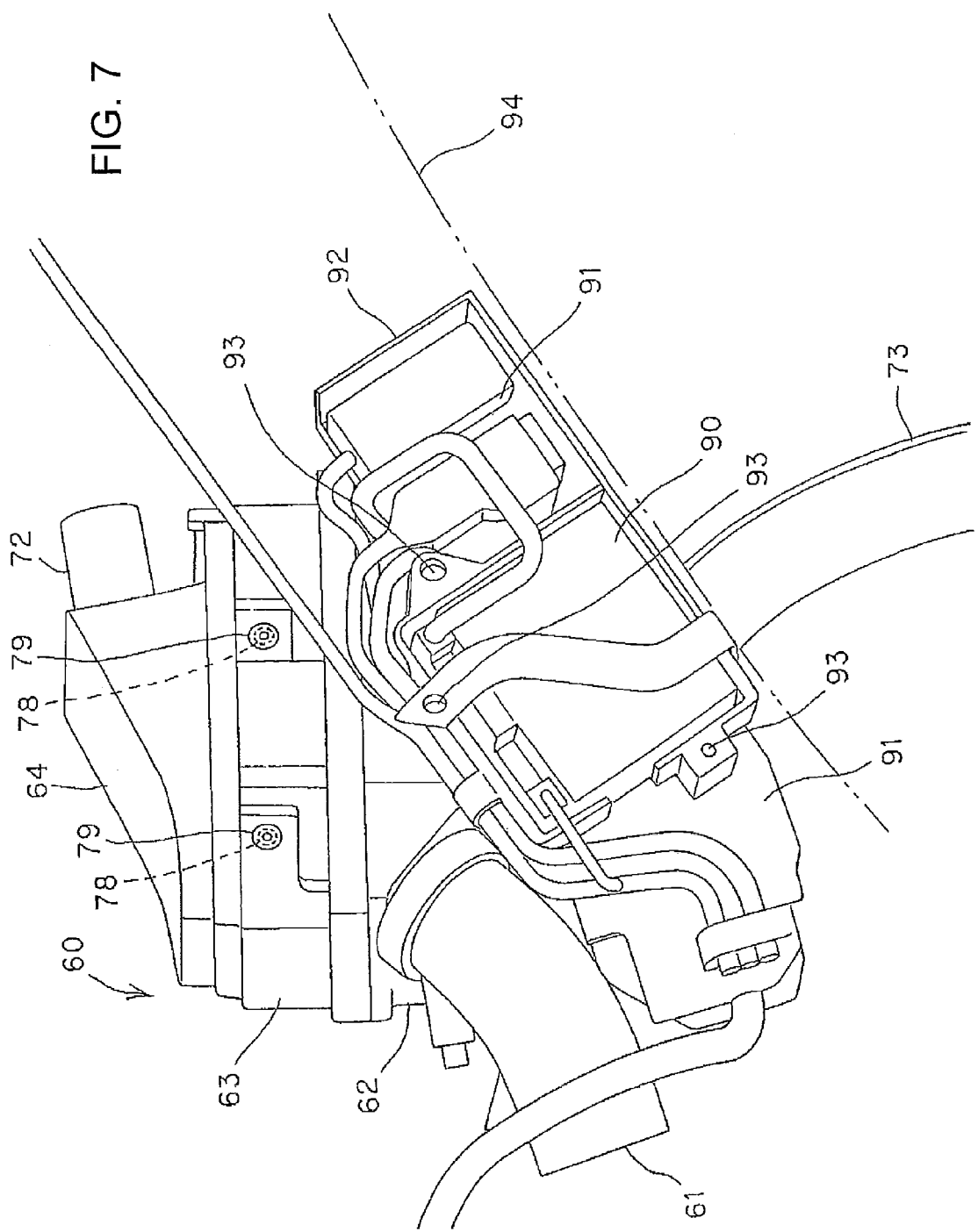
FIG. 7 is a perspective view, seen from the left side surface of the body, of the inner side of the left rear body.

FIG. 7 is a perspective view, seen from the left side surface of the body, of the inner side of the left rear body 30b.

At the inner side of the rear frame 30, the battery 90 for supplying power to the vehicle and an electrical component 91 are arranged between the air cleaner case 60 and the left rear body 30b. The electrical component 90 is arranged in front and rear of the battery 90. The battery 90 and the electrical component 91 are attached to a case 92 extending upward towards the rear in the front and rear direction of the body.

The portion attached with the battery 90 of the case 92 bulges out to the side of the air cleaner case 60 in accordance with the shape of the battery 90. Thus, as shown in FIG. 4, the left side surface of the air cleaner case 60 is formed with the recessed portion 62a depressed in accordance with the shape of the battery 90, so that the battery 90 can be attached to the side of the air cleaner case 60 at the lower side of the seat 14. The case 92 is bolted to the left rear body 30b and the center frame 4 on the left side through an attachment hole 93. Furthermore, in FIG. 7, the chain line 94 shown parallel to the bottom surface of the case 92 takes into consideration the movement range of the drive chain 19, and shows that it is not subject to the influence of the drive chain 19 if on the upper side above the chain line 94.

Therefore, the battery 90 and the electrical component 91 are arranged on the side of the air cleaner case 60 near the engine 7, and heavy objects are collected near the center of gravity of the body, thereby achieving concentration of mass.

Figure 8:
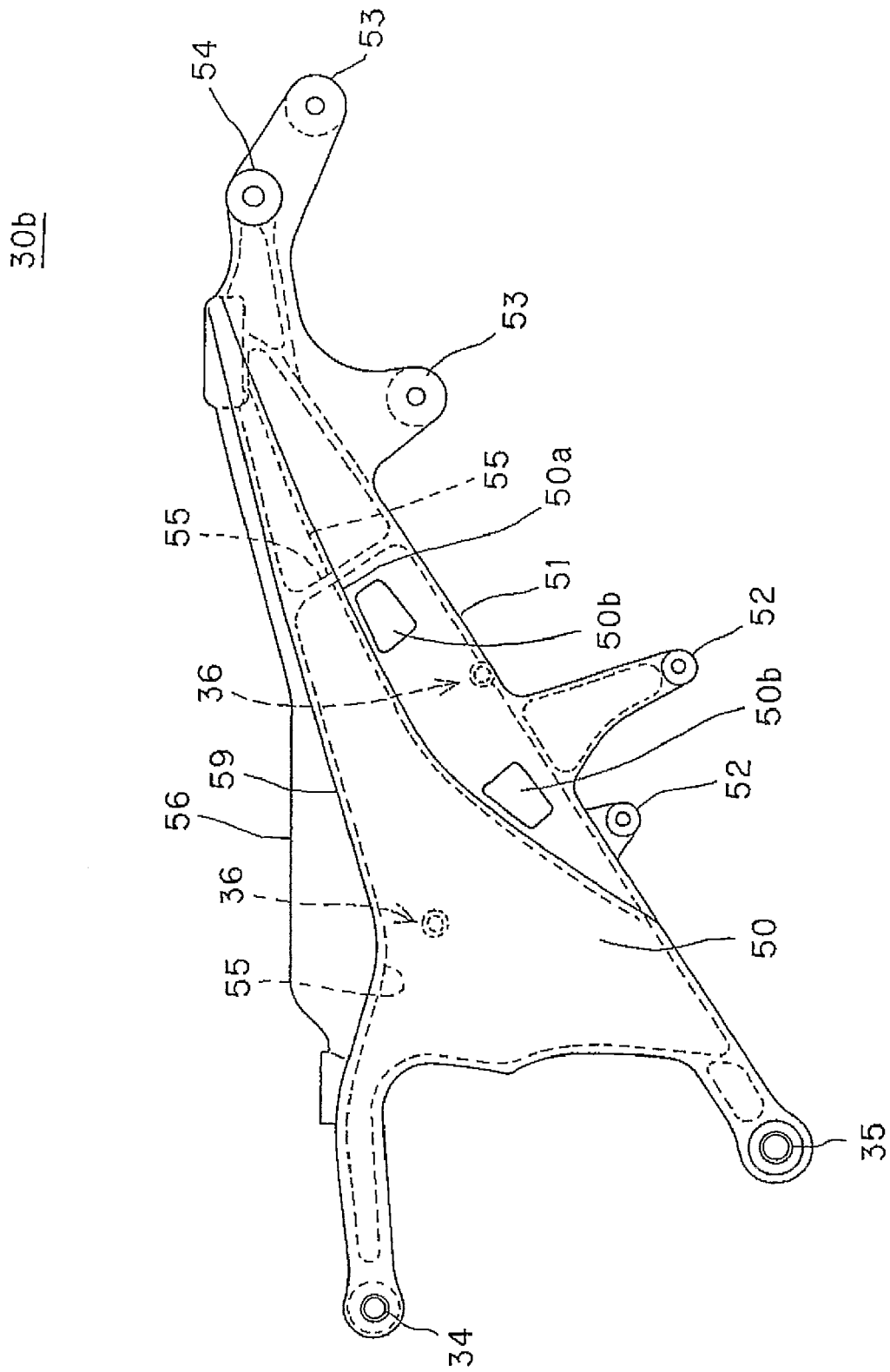
FIG. 8 is a side view of the left rear body seen from the left side.
Figure 9:
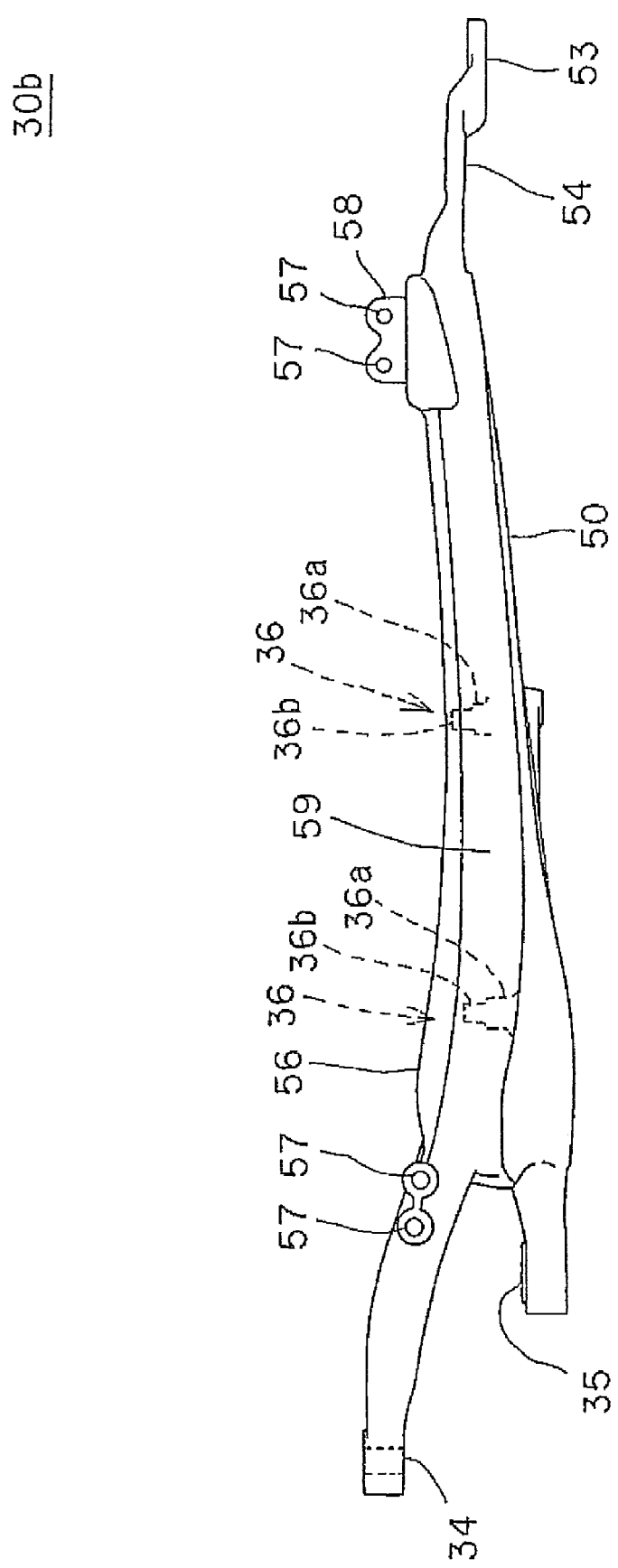
FIG. 9 is a plan view of the left rear body seen from above.
Figure 10:
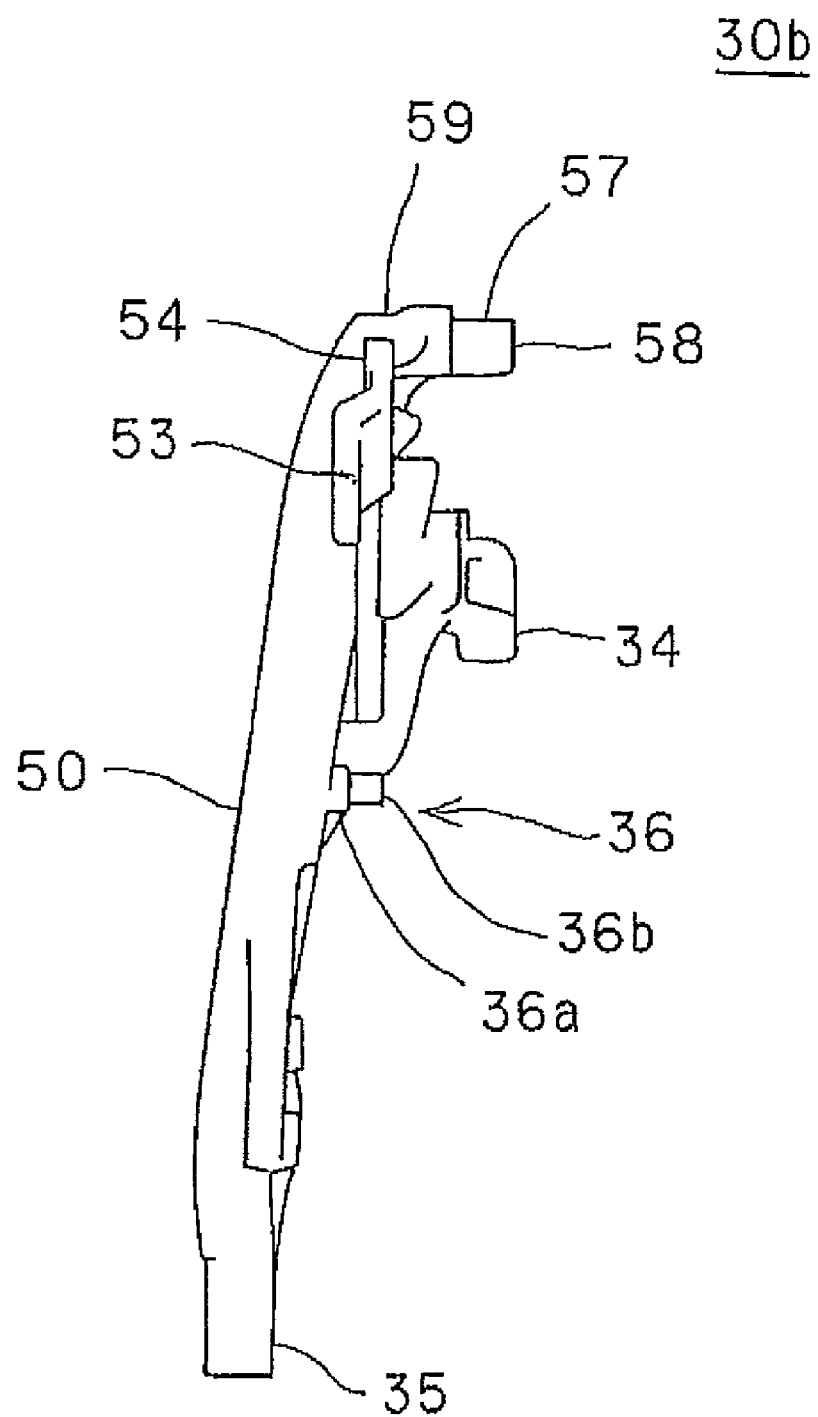
FIG. 10 is a front view of the left rear body seen from the rear side of the body.

FIG. 8 is a side view of the left rear body 30b seen from the left side. FIG. 9 is a plan view of the left rear body 30b seen from above. FIG. 10 is a front view of the left rear body 30b seen from the rear side of the body.

As shown in FIG. 8, the left rear body 30b is arranged with an extended portion, etc. with a substantially triangular plate-shaped side plate 50 as the base, and is configured by being formed with the holes 34, 35 and the projection 36. Two extended portions extending to the lower side from the side 51 which extends upward towards the rear are formed with a hole 52 for bolting the case 92. The extended portion extending to the lower side from the side 51 at the vicinity of the rear end of the left rear body 30b and the rear end are formed with a hole 53 for bolting the rear fender 17. A hole 54 for bolting the seat 14 is formed in the vicinity of the front side of the hole 53 at the rear end.

The projection 36 is formed at two locations in correspondence to the position of the pass-through hole 78 formed in the air cleaner case 60. The projection 36 on the front side is formed near the middle of the side plate 50. The projection 36 on the rear side is formed near the side 51.

A rib 55 is formed on the inner side of the left rear body 30b so as to lie along the substantially triangular outer periphery of the left rear body 30b. The rib 55 extending to the upper side from the side 51 extends to the upper side from the side 51, and connects to the rib 55 at the upper portion of the left rear body 30b. Furthermore, the side plate 50 is formed with a step difference 50a with the boundary extending upward towards the rear from the front portion of the side 51 as a boundary. The rib 55 is also formed on the back side of the step difference 50a. Therefore, the left rear body 30b is arranged with the rib 55 to ensure strength, and the plate thickness is made appropriate to thereby satisfy higher strength and lighter weight. An opening 50b is formed at two locations on the lower side of the step difference 50a at the side plate 50.

As shown in FIG. 9 and FIG. 10, the upper surface of the left rear body 30b extends so as to form the rib in the inward direction of the body, and forms a seat supporting surface 59 that abuts on the bottom of the seat 14. The projection 36 is arranged in an upstanding manner facing the inner side of the body.

As shown in FIG. 3 and FIG. 9, the end on the inward direction of the body of the upper surface of the left rear body 30b is formed with a hanging portion 56 hanging out towards the inner side so as to cover the side of the air cleaner case 60. Furthermore, the upper surface of the left rear body 30b is formed with a bolt hole 57 to which the bolt 33 for fixing the front cross member 31 and the rear cross member 32 is fastened. The bolt hole 57 at the front portion of the left rear body 30b is arranged at the extended portion extending towards the front side, and the bolt hole 57 at the rear portion is formed at a projecting portion 58 projecting to the side of the air cleaner case 60. As shown in FIG. 10, the side plate 50 is formed such that the width spreads from the upper surface of the left rear body 30b towards the lower side.

Figure 11:
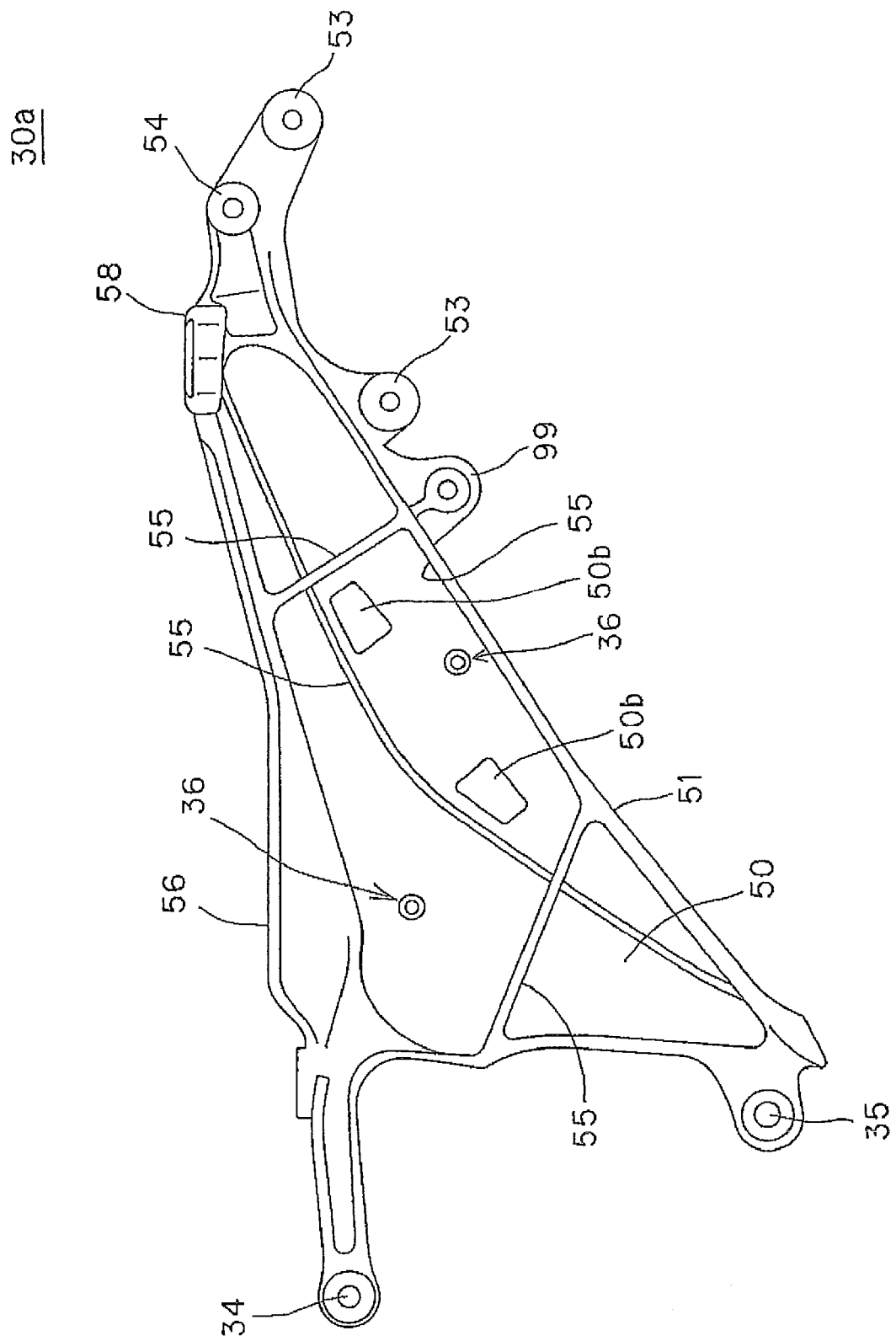
FIG. 11 is a side view of the right rear body seen from the inner side of the body.
Figure 12:
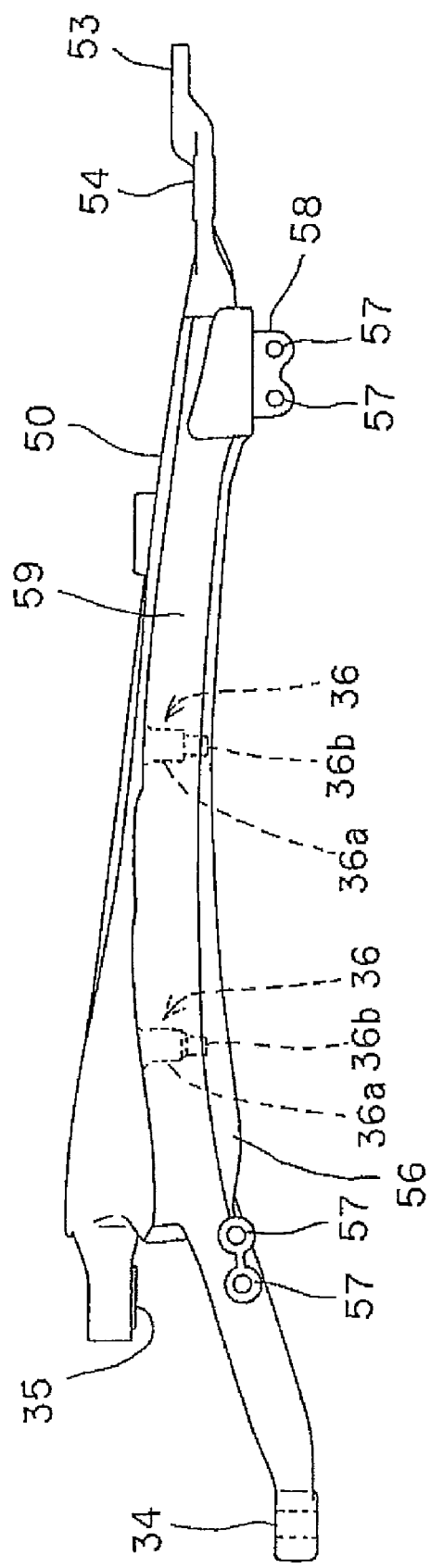
FIG. 12 is a plan view of the right rear body seen from above.
Figure 13:
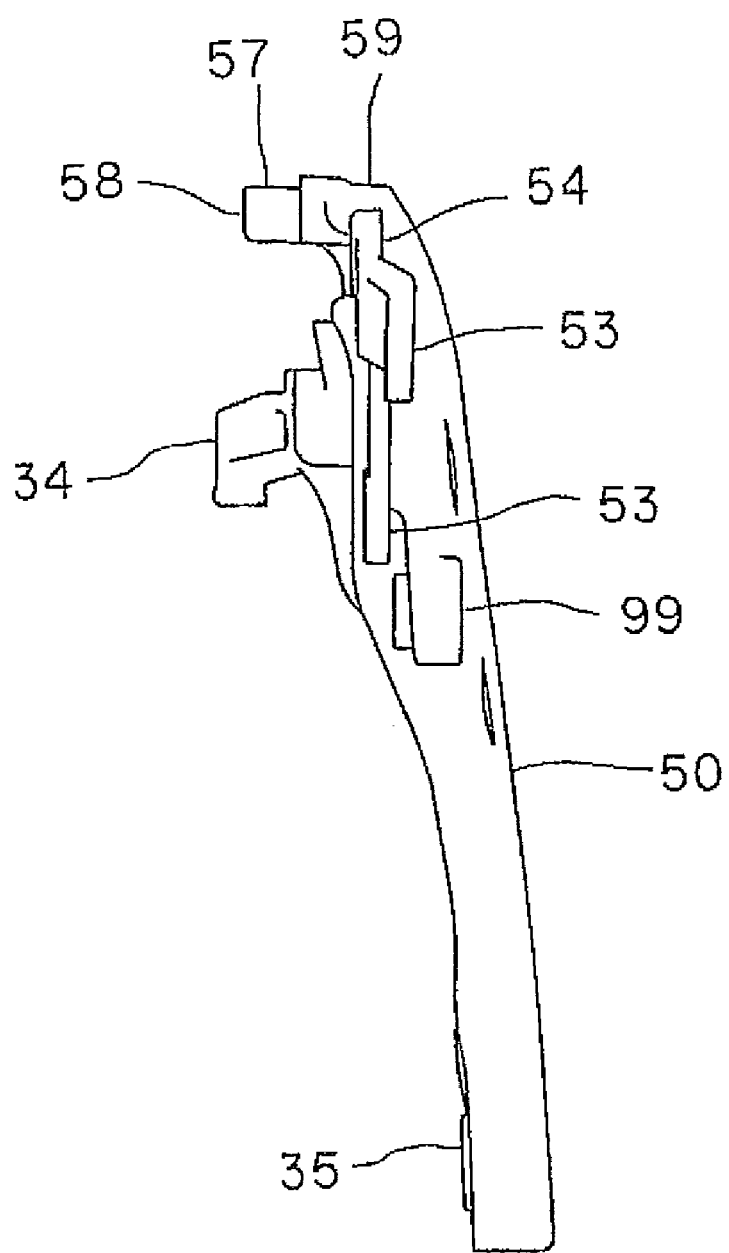
FIG. 13 is a front view of the right rear body seen from the rear side of the body.

FIG. 11 is a side view of the right rear body 30a seen from the inner side of the body. FIG. 12 is a plan view of the right rear body 30a seen from above. FIG. 13 is a front view of the right rear body 30a seen from the rear side of the body.

As shown in FIGS. 11-13, the right rear body 30a is formed substantially symmetric to the left rear body 30b described above. Here, the right rear body 30a will be described on the portions different from the left rear body 30b.

In the right rear body 30a, a muffler stay 99 projecting to the lower side from the side 51 is formed adjacent to the hole 53 used to fix the rear fender 17. The muffler 22 (FIG. 1) is supported by the muffler stay 99.

At the right rear body 30a, in addition to the rib 55 extending to the upper side from the side 51, the rib 55 extends towards the front side from the side 51 and is connected to the rib 55 at the front portion of the right rear body 30a. Since the battery 90 is not arranged on the right side of the body, the hole 52 (FIG. 8) for bolting the case 92 is not formed.

As shown in FIG. 12, the projection 36 of the right rear body 30a is arranged in an upstanding manner facing the inner side of the body while facing the projection 36 of the left rear body 30b.

Here, the right rear body 30a and the left rear body 30b are manufactured through die casting using metal such as aluminum alloy for the material. The right rear body 30a and the left rear body 30b have a simple shape of a plate shape, and thus can be easily manufactured through die casting.

As described above, according to the first embodiment in the present invention, the rear frame 30 is assembled by coupling the left and right divided right rear body 30a and the left rear body 30b with the front cross member 31 and the rear cross member 32. The air cleaner case 60 is fixed inside the rear frame 30 by fitting the projection 36 arranged on the right rear body 30a and the left rear body 30b to the pass-through hole 78 of the air cleaner case 60. Therefore, the air cleaner case 60 is easily fixed to the rear frame 30 by simply fitting the projection 36 of the right rear body 30a and the left rear body 30b to the pass-through hole 78 of the air cleaner case 60. Since the air cleaner case 60 is fixed by the fitting of the projection 36 and the pass-through hole 78 of the air cleaner case 60 without using a screw and the like, the air cleaner case 60 fitted to the projection 36 can be easily detached by detaching the coupling of the left and the right rear bodies 30b, 30a and the front cross member 31 and the rear cross member 32. Thus, the air cleaner case 60 can be detachably fixed to the rear frame 30 with a simple structure by a configuration of fitting the projection 36 arranged on the rear frame 30 divided to the left and the right to the pass-through hole 78 of the air cleaner case 60. With this simple structure, the degree of design freedom can be enhanced and the outer appearance can be improved.

The front cross member 31 and the rear cross member 32, and the left and right rear bodies 30b, 30a can be attached and detached with the bolt 33, and the assembling and the disassembling of the rear frame 30 can be facilitated. Therefore, the air cleaner case 60 can be detachably fixed to the rear frame 30 with a simple structure.

The maintenance performance is satisfactory since the cover 64 of the air cleaner case 60 is detached from the opening 80 on the upper side of the rear frame 30 with the seat 14 removed, the air cleaner element 65 is detached from the air cleaner case 60, and the air cleaner element 65 is easily dissembled and assembled for maintenance.

The cover 64 of the air cleaner case 60 opens at the upper side above the pass-through hole 78 fitted with the projection 36. Therefore, the cover 64 can be easily opened without resolving the fitting of the projection 36 and the pass-through hole 78. That is, the cover 64 can be opened without detaching the air cleaner case 60 from the rear frame 30. The maintenance performance is satisfactory since the air cleaner element 65 can be easily dissembled and assembled for maintenance.

The receiving portion of the projection 36 is the pass-through hole 78 passing through the air cleaner case 60. Therefore, the projection 36 fitted to the pass-through hole 78 does not need to be strictly managed regarding the axial length dimension, whereby the manufacturing of the rear body 30 is facilitated. Furthermore, since the position of the pass-through hole 78 is on the dirty side D where the air before cleaning flows, problems do not arise even if small amount of air flows in from the pass-through hole, and the influence of arranging the pass-through hole 78 can be prevented.

The first embodiment shows one mode of the present invention, and the present invention is not limited to the above embodiment. For instance, in the first embodiment, the projection 36 has been described that the columnar projection is arranged at two locations at each side surface of the right rear body 30a and the left rear body 30b, but the present invention is not limited thereto. For instance, the projection 36 may be arranged at two or more locations, or a projection having a square or a polygonal cross section may be formed at one location. Other detailed configuration can be arbitrarily changed.

Second Embodiment

A second embodiment applied with the present invention will be described below with reference to FIGS. 14 to 17. In the second embodiment, the portions configured similar to the first embodiment are denoted with the same reference numerals, and the description regarding these portions will be omitted.

In the second embodiment, a right rear body 130a is arranged in place of the right rear body 30a in the first embodiment, and a left rear body 130b is arranged in place of the left rear body 30b. Furthermore, an air cleaner case 160 is arranged in place of the air cleaner case 60 in the first embodiment. The second embodiment differs from the first embodiment in that a projection 136 arranged on the left and the right rear bodies 130b, 130a is fitted to the side of the clean side C of the air cleaner case 160.

Figure 14:
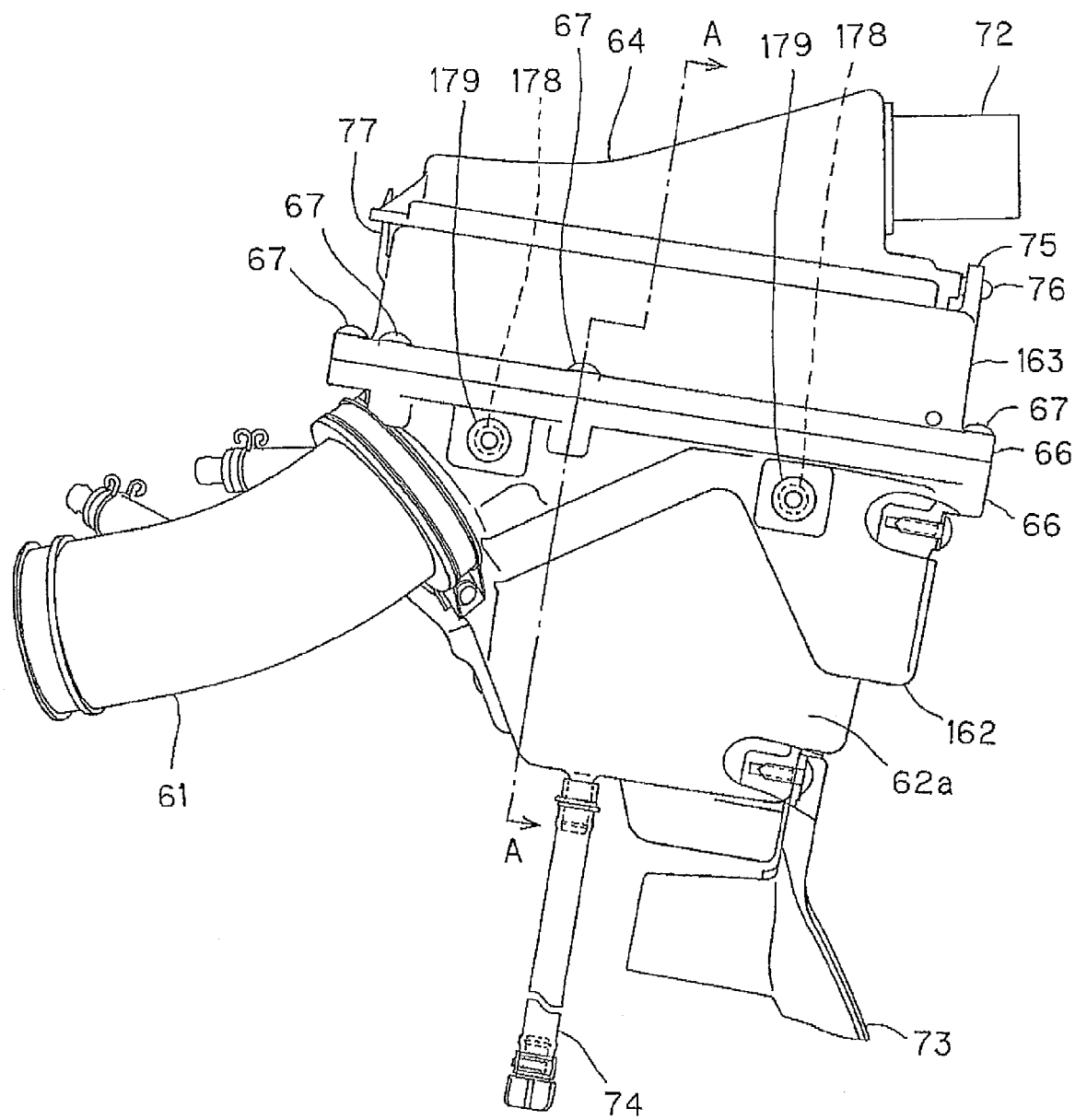
FIG. 14 is a side view of an air cleaner case according to a second embodiment seen from the left side of the body.

FIG. 14 is a side view of the air cleaner case 160 seen from the left side of the body. The air cleaner case 160 includes a lower case 162 connected with the connecting tube 61 and an upper case 163 to be attached to the lower case 162, where the air cleaner element 65 is arranged therein, and the cover 64 is attached to the upper case 163, similar to the first embodiment.

The lower case 162 is formed with a recess 178 serving as the receiving portion of the projection 136 arranged on the side surface of the lower case 62 of the first embodiment. The recess 178 is a recess that does not pass through the interior of the lower case 162. The upper case 163 is configured without the pass-through hole 78, which is formed in the upper case 63 in the first embodiment.

Thus, in the air cleaner case 160, the recess 178 that does not pass through the interior of the air cleaner case 160 is formed at the side surface of the lower case 162. The recess 178 is a round hole and is formed at two locations on the left and the right side surfaces, respectively, of the lower case 162. Each recess 178 is fitted with a fit-in member 179 made from a rubber material.

Figure 15:
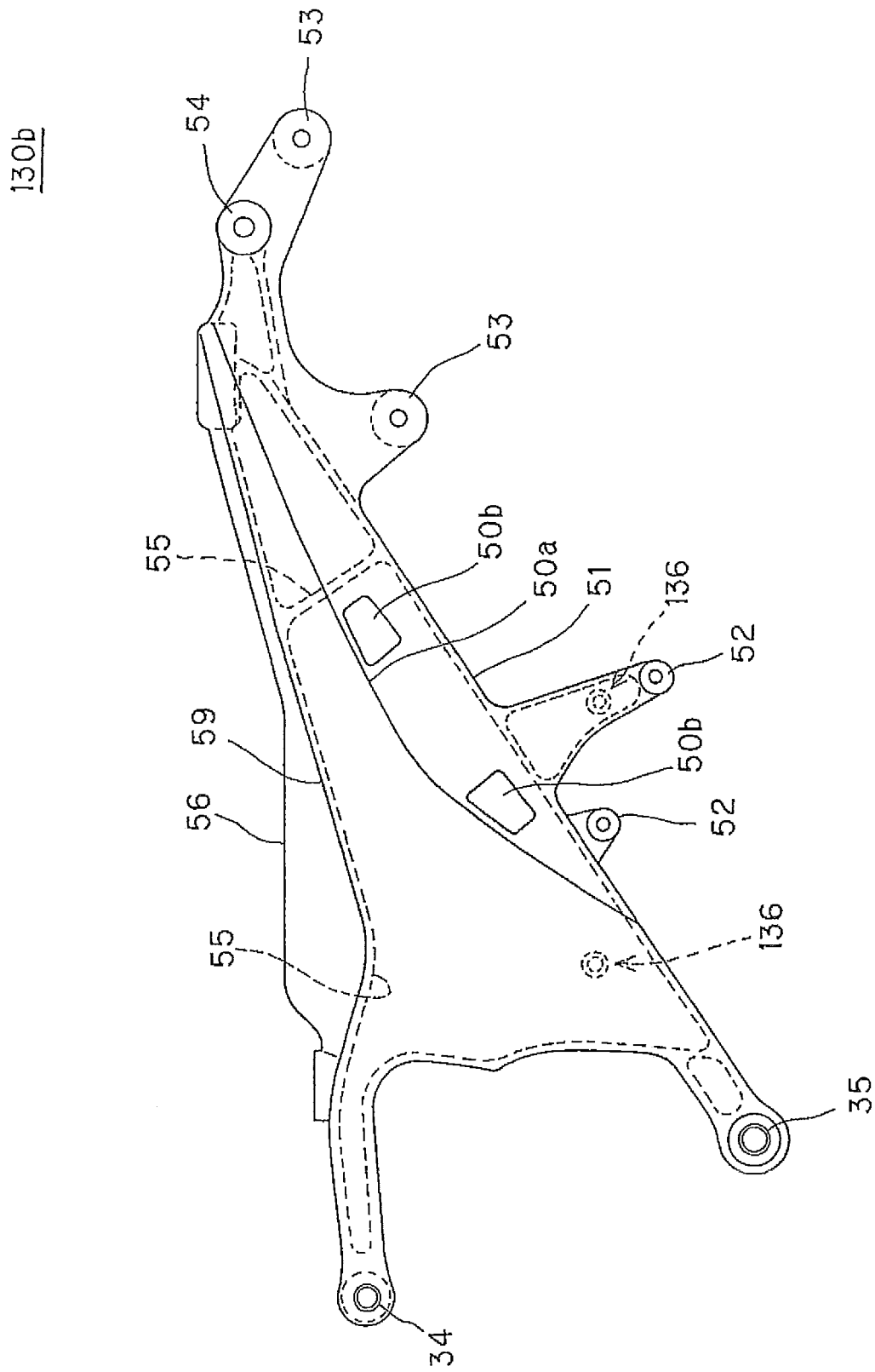
FIG. 15 is a side view of a left rear body seen from the left side.
Figure 16:
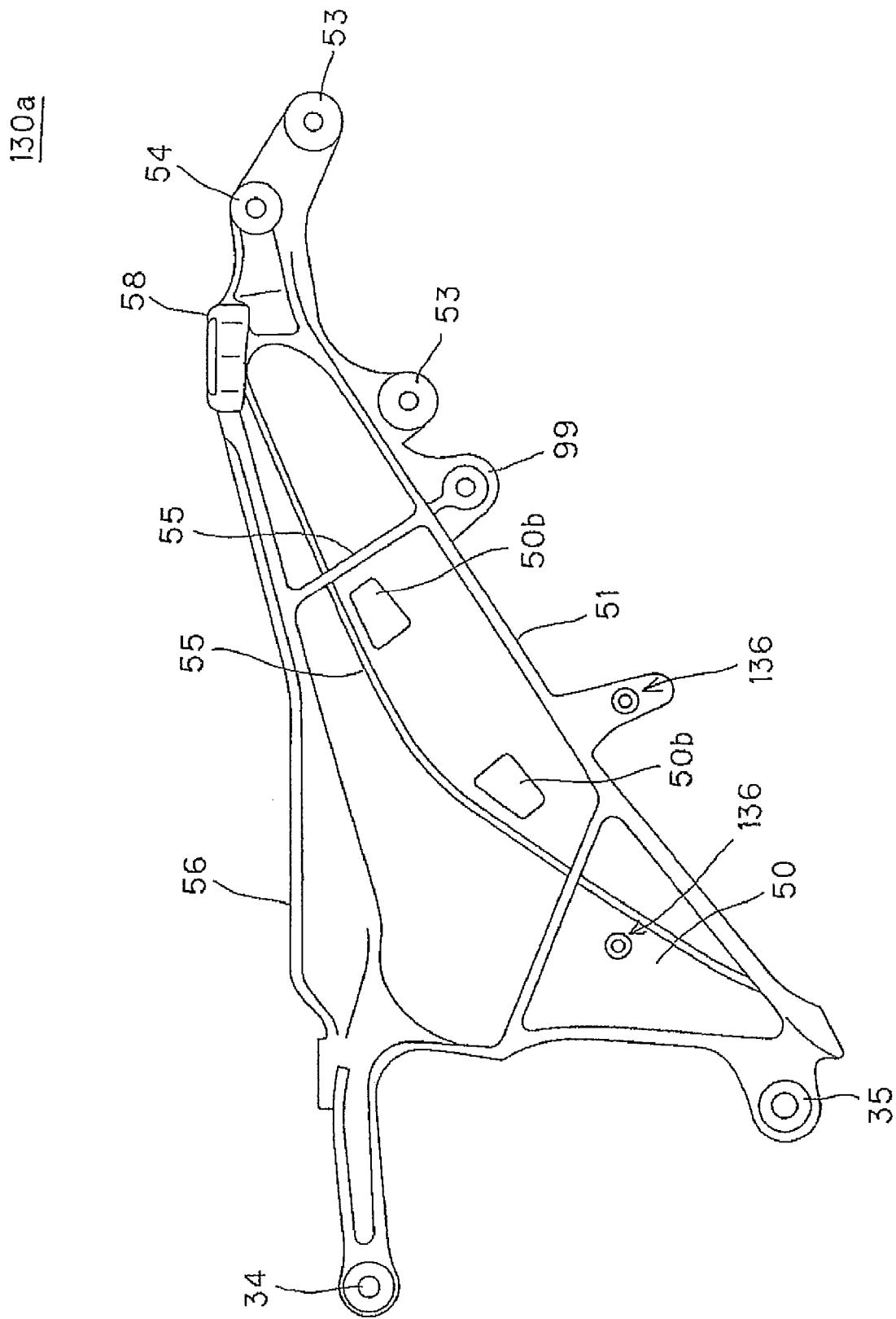
FIG. 16 is a side view of a right rear body seen from the inner side of the body.

FIG. 15 is a side view of the left rear body 130b seen from the left side. FIG. 16 is a side view of the right rear body 130a seen from the inner side of the body.

The projection 136 to be fitted to the recess 178 is formed at a position corresponding to the position of the recess 178 arranged on the air cleaner case 160. The projection 136 is formed at two locations on the left rear body 130b and the right rear body 130a, respectively.

As shown in FIG. 15, in the left rear body 130b, one projection 136 is formed at the lower portion on the front side of the left rear body 130b, and the other projection 136 is formed on the extended portion formed with the hole 52.

As shown in FIG. 16, in the right rear body 130a, one projection 136 is formed at the lower portion on the front side of the right rear body 130a, and the other projection 136 is formed on the extended portion extended to the lower side from the side 51.

Figure 17:
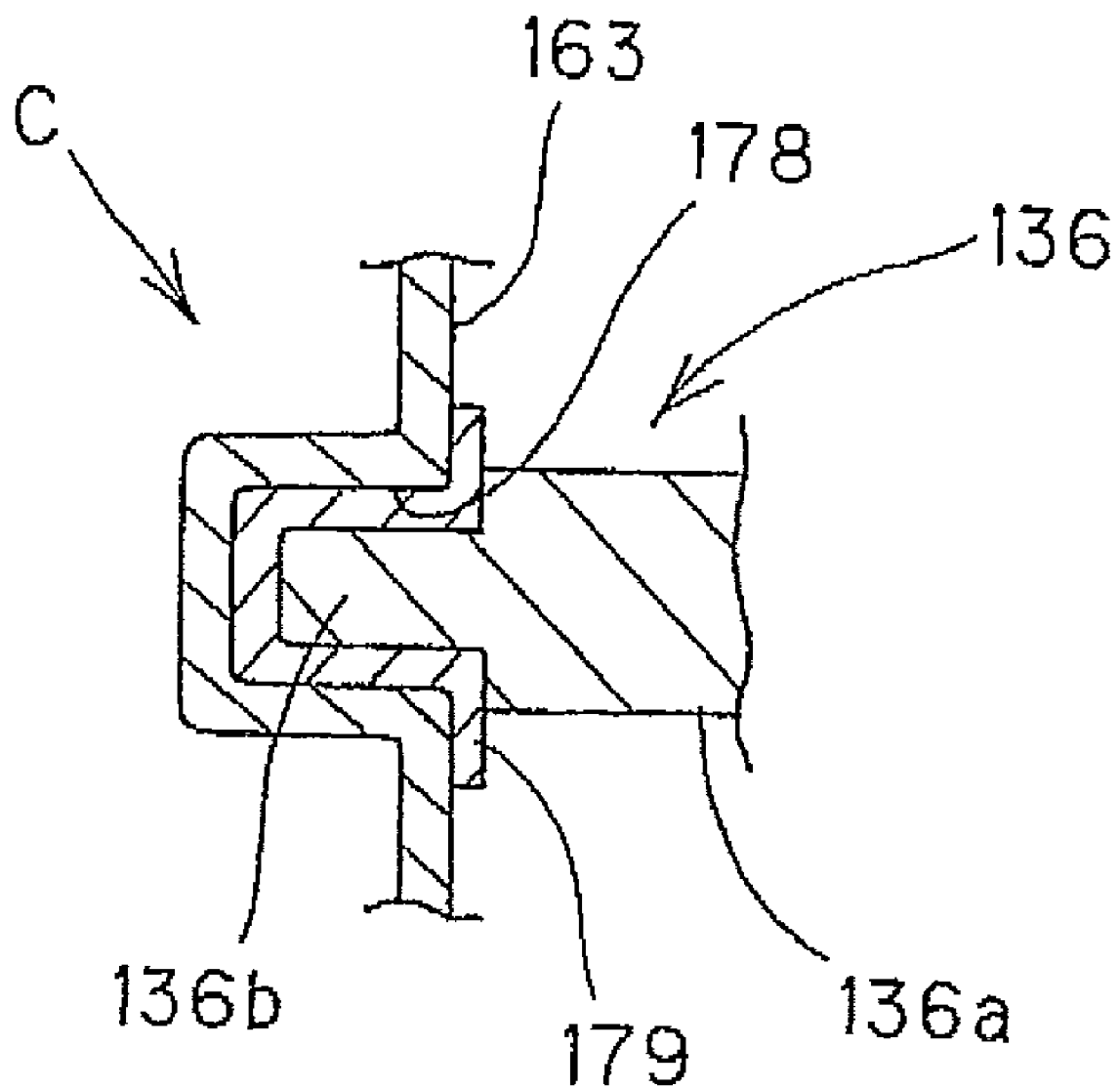
FIG. 17 is a cross-sectional view of a fit-in portion of a recess and a projection.

FIG. 17 is a cross-sectional view of a fit-in portion of the recess 178 and the projection 136. The projection 136 is configured by a base 136a arranged in an upstanding manner on the left rear body 130b and the right rear body 130a, and a projection distal end 136b having the distal end of the base 136a formed to a small diameter.

The recess 178 is a receiving portion formed with the wall portion of the lower case 162 depressed towards the inner side on the side of the clean side C of the air cleaner case 160. The fit-in member 179 is a member formed to a recess shape, where the projection distal end 136b of the projection 136 is fitted to the recess of the fit-in member 179. In other words, each projection 136 of the right rear body 130a and the left rear body 130b is fitted into each recess 178 of the air cleaner case 160 by way of each fit-in member 179.

With the projection 136 fitted in the recess 178, the distal end face of the projection distal end 136b and the end of the base 136a of the projection 136 abut on the fit-in member 179, to thereby push the air cleaner case 160 in the inward direction of the body by way of the fit-in member 179. Thus, the air cleaner case 160 is sandwiched by the projection 136 from both left and right sides of the body. Therefore, the position in the width direction is fixed.

Therefore, the recess 178 is the receiving portion that does not pass through the interior of the air cleaner case 160. Therefore, the outside air is not taken in from the recess 178, and problems do not arise even if the recess 178 is arranged on the clean side C on which the cleaned air passes. Thus, the recess 178 can be arranged on both the dirty side D and the clean side C, which enhances the degree of freedom of design.

Furthermore, the fit-in member 179 is made from rubber material, so that the fit-in member 179 can be deformed to enable the projection 136 to be press fit. Therefore, the air cleaner case 160 can be reliably fixed without rattling. Since the fit-in member 179 is made of rubber material, the vibration transmitted to the air cleaner case 160 can be reduced.

As described above, according to the second embodiment of the present invention, the recess 178 serving as the receiving portion to which the projection 136 is fitted can be arranged on the clean side C. Thus, the recess 178 can be arranged on both the dirty side D and the clean side C. Therefore, the degree of design freedom can be enhanced. Since the recess 178 does not pass through the air cleaner case 160, the unclean air is not taken into the clean side C even if the recess 178 is arranged on the clean side C.

The second embodiment is one mode of the present invention, and the present invention is not limited to such embodiment. For instance, in the second embodiment, the recess 178 is described as being arranged on the side of the clean side C of each left and right side surface of the air cleaner case 160, but the present invention is not limited thereto. For instance, the recess 178 may be arranged at two locations on the side of the dirty side D, or may be arranged at one location each on each side of the dirty side D and the clean side C. Other detailed configurations can be arbitrarily changed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
a head pipe arranged at a front portion of a body and configured to pivotally support a front fork;
a main frame passing an upper side of an engine from the head pipe and extending towards a rear of the body;
a rear frame extending towards the rear of the body from the main frame and supporting a seat at an upper side thereof;
an air cleaner case at a lower side of the seat; and
an air cleaner element arranged inside the air cleaner case and configured to clean air,
wherein the rear frame includes a pair of left and right rear bodies of a plate shape which cover sides of the air cleaner case, and a plurality of cross members configured to couple the left and right rear bodies,
wherein each rear body is formed with a projection projecting towards an inner side of the body, and a receiving portion configured to fit the projection is through a sidewall of the air cleaner case, and
wherein each rear body and the cross members are detachably coupled by a bolt.

2. The motorcycle according to claim 1, wherein
a space in the rear frame surrounded by the rear body and the cross members is formed with an opening facing the seat, and
the air cleaner case includes a cover facing the opening from the space in the rear frame, the cover being openable to dissemble and assemble the air cleaner element.

3. The motorcycle according to claim 2, wherein the cover is openable at an upper side of the receiving portion arranged on the air cleaner case.

4. The motorcycle according to claim 3, wherein the receiving portion is a pass-through hole through the sidewall of the air cleaner case and formed on an upstream side of an air flow above the air cleaner element in the air cleaner case.

5. The motorcycle according to claim 1, wherein
a space in the rear frame surrounded by the rear body and the cross members is formed with an opening facing the seat, and
the air cleaner case includes a cover facing the opening from the space in the rear frame, the cover being openable to dissemble and assemble the air cleaner element.

6. The motorcycle according to claim 5, wherein the cover is opened at an upper side of the receiving portion arranged on the air cleaner case.

7. The motorcycle according to claim 6, wherein the receiving portion is a pass-through hole through the sidewall of the air cleaner case and formed on an upstream side of an air flow above the air cleaner element in the air cleaner case.

8. The motorcycle according to claim 1, wherein the receiving portion is a pass-through hole through the sidewall of the air cleaner case and formed on an upstream side of an air flow above the air cleaner element in the air cleaner case.

* * * * *